(12) United States Patent
Thain et al.

(10) Patent No.: US 10,931,364 B2
(45) Date of Patent: Feb. 23, 2021

(54) SATELLITE PAYLOAD COMPRISING A DUAL REFLECTIVE SURFACE REFLECTOR

(71) Applicant: AIRBUS DEFENCE AND SPACE SAS, Toulouse (FR)

(72) Inventors: Andrew Thain, Toulouse (FR); Vincent Tugend, Toulouse (FR)

(73) Assignee: Airbus Defence and Space SAS, Toulouse (FR)

( * ) Notice: Subject to any disclaimer, the term of this patent is extended or adjusted under 35 U.S.C. 154(b) by 0 days.

(21) Appl. No.: 16/761,981

(22) PCT Filed: Nov. 8, 2018

(86) PCT No.: PCT/EP2018/080577
§ 371 (c)(1),
(2) Date: May 6, 2020

(87) PCT Pub. No.: WO2019/092087
PCT Pub. Date: May 16, 2019

(65) Prior Publication Data
US 2020/0322043 A1 Oct. 8, 2020

(30) Foreign Application Priority Data
Nov. 8, 2017 (FR) ...................................... 1760470

(51) Int. Cl.
*B64G 1/66* (2006.01)
*H04B 7/185* (2006.01)
(Continued)

(52) U.S. Cl.
CPC ....... *H04B 7/18515* (2013.01); *B64G 1/1007* (2013.01); *B64G 1/66* (2013.01);
(Continued)

(58) Field of Classification Search
CPC ............ H04B 7/18515; H04B 7/18513; H01Q 1/288; H01Q 15/16; B64G 1/007; B64G 1/66
(Continued)

(56) References Cited

U.S. PATENT DOCUMENTS

| 4,298,877 A | * | 11/1981 | Sletten | ................. | H01Q 1/1264 343/781 CA |
| 4,342,036 A | * | 7/1982 | Scott | ........................ | H01Q 5/45 343/836 |

(Continued)

FOREIGN PATENT DOCUMENTS

EP        1 083 626        3/2001

OTHER PUBLICATIONS

"Electronics Letters", Stevenage, Herts., GB, Jun. 20, 1991, vol. 27, No. 13, 1 page.
(Continued)

*Primary Examiner* — Hai V Nguyen
(74) *Attorney, Agent, or Firm* — Nixon & Vanderhye, P.C.

(57) ABSTRACT

A satellite payload (20) including a reflector (22), a network (23) of sources (24) and a beam forming network connected to said sources in order to form beams for carrying signals in a first frequency band, called "band B1", and in a second frequency band, called "band B2". The reflector comprises two reflective surfaces (22a, 22b) positioned one behind the other in relation to the network of sources and having different curvatures so that each reflective surface generates an image of the network of sources with a different magnification factor. The reflective surface closest to the network of sources is transparent for all the signals carried on the
(Continued)

Figure 1:
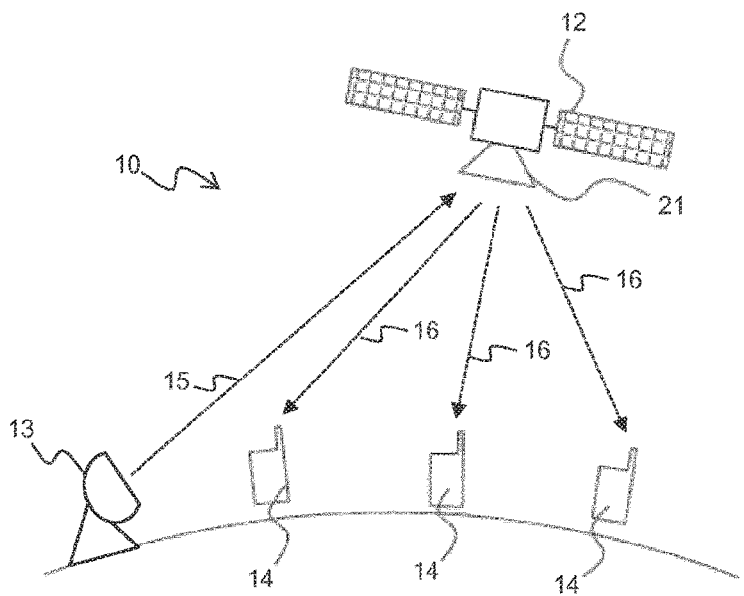

band B2 and is adapted to reflect signals carried in the band B1. The other reflective surface is adapted to reflect signals carried in the band B2.

15 Claims, 5 Drawing Sheets

(51) Int. Cl.
   *B64G 1/10* (2006.01)
   *H01Q 1/28* (2006.01)
   *H01Q 15/16* (2006.01)

(52) U.S. Cl.
   CPC ............. *H01Q 1/288* (2013.01); *H01Q 15/16* (2013.01); *H04B 7/18513* (2013.01)

(58) Field of Classification Search
   USPC .......................................... 455/12.1; 343/837
   See application file for complete search history.

(56) References Cited

U.S. PATENT DOCUMENTS

| | | | | |
|---|---|---|---|---|
| 4,701,765 | A | 10/1987 | Arduini et al. | |
| 4,792,813 | A * | 12/1988 | Rosen | H01Q 25/001 343/756 |
| 4,855,751 | A * | 8/1989 | Ingerson | H01Q 19/17 343/779 |
| 4,872,015 | A * | 10/1989 | Rosen | H04B 7/1853 342/353 |
| 4,972,199 | A * | 11/1990 | Raghavan | H01Q 19/17 343/756 |
| 5,130,718 | A * | 7/1992 | Wu | H01Q 15/0033 343/781 CA |
| 5,162,809 | A * | 11/1992 | Wu | H01Q 15/0033 343/753 |
| 5,497,169 | A * | 3/1996 | Wu | H01Q 15/0033 333/134 |
| 5,576,721 | A * | 11/1996 | Hwang | H01Q 25/007 343/753 |
| 5,734,345 | A * | 3/1998 | Chen | H01Q 3/2694 342/367 |
| 5,903,241 | A * | 5/1999 | Bhattacharyya | H01Q 13/0266 343/786 |
| 5,903,549 | A * | 5/1999 | von der Embse | H04B 7/216 370/310 |
| 6,043,779 | A * | 3/2000 | Lalezari | H01Q 3/26 342/371 |
| 6,246,364 | B1 * | 6/2001 | Rao | H01Q 1/288 342/368 |
| 6,252,559 | B1 * | 6/2001 | Donn | H01Q 19/19 343/756 |
| 6,545,645 | B1 * | 4/2003 | Wu | H01Q 19/104 343/781 CA |
| 6,678,520 | B1 * | 1/2004 | Wang | H04B 7/18513 455/13.1 |
| 6,774,861 | B2 * | 8/2004 | Choung | H01Q 19/192 343/781 CA |
| 6,795,034 | B2 * | 9/2004 | Lyerly | H01Q 19/17 343/781 CA |
| 6,806,843 | B2 * | 10/2004 | Killen | H01Q 3/46 343/700 MS |
| 6,831,613 | B1 * | 12/2004 | Gothard | H01Q 3/0266 343/779 |
| 6,885,355 | B2 * | 4/2005 | Killen | H01Q 15/02 343/700 MS |
| 6,897,447 | B2 * | 5/2005 | Mitra | G01J 3/26 250/338.4 |
| 6,900,763 | B2 * | 5/2005 | Killen | H01Q 5/0053 333/202 |
| 6,937,201 | B2 * | 8/2005 | Gothard | H01Q 19/193 343/781 CA |
| 6,937,203 | B2 * | 8/2005 | Rao | H01Q 3/2658 333/125 |
| 6,965,351 | B1 * | 11/2005 | Miller | H01Q 1/288 343/781 CA |
| 7,015,867 | B1 * | 3/2006 | Miller | H01Q 19/062 343/755 |
| 7,038,632 | B2 * | 5/2006 | Webb | H01Q 19/027 343/781 CA |
| 7,135,698 | B2 * | 11/2006 | Mitra | H01L 27/14649 257/21 |
| 7,161,549 | B1 * | 1/2007 | Cuchanski | H01Q 1/288 343/781 CA |
| 7,183,966 | B1 * | 2/2007 | Schramek | G01S 17/87 244/3.1 |
| 7,242,360 | B2 * | 7/2007 | Wu | H01Q 19/19 343/779 |
| 7,463,207 | B1 * | 12/2008 | Rao | H01Q 13/0208 343/779 |
| 7,522,116 | B2 * | 4/2009 | Balling | H01Q 1/288 343/755 |
| 7,605,768 | B2 * | 10/2009 | Ebling | H01Q 1/3233 343/700 MS |
| 7,643,827 | B1 * | 1/2010 | Kiesling | H01Q 19/132 455/427 |
| 7,737,903 | B1 * | 6/2010 | Rao | H01Q 5/55 343/786 |
| 7,751,779 | B2 * | 7/2010 | Ho | H04B 7/18515 455/12.1 |
| 7,800,549 | B2 * | 9/2010 | Rebeiz | H01Q 3/24 343/754 |
| 7,868,840 | B2 * | 1/2011 | Rao | H01Q 5/45 343/786 |
| 8,354,956 | B2 * | 1/2013 | Matyas | H01Q 19/12 342/354 |
| 8,384,610 | B2 * | 2/2013 | Schreider | H01Q 3/20 343/781 P |
| 8,514,140 | B1 * | 8/2013 | Rao | H01Q 19/132 343/786 |
| 8,552,917 | B2 * | 10/2013 | Mathews | H01Q 1/288 343/779 |
| 8,634,414 | B2 * | 1/2014 | Leong | H04B 7/18515 370/389 |
| 8,680,450 | B2 * | 3/2014 | Pritchard | F41G 7/2293 244/3.16 |
| 8,780,000 | B2 * | 7/2014 | Palacin | H01Q 25/007 343/779 |
| 8,957,821 | B1 * | 2/2015 | Rao | H01Q 13/025 343/786 |
| 9,054,414 | B2 * | 6/2015 | Mizzoni | H01Q 15/147 |
| 9,246,234 | B2 * | 1/2016 | Rao | H01Q 19/19 |
| 9,356,685 | B2 * | 5/2016 | Angeletti | H04B 7/2041 |
| 9,478,861 | B2 * | 10/2016 | Fonseca | H01Q 5/30 |
| 9,698,492 | B2 * | 7/2017 | Rao | H01P 1/2138 |
| 9,865,921 | B2 * | 1/2018 | Griffith | G02B 17/0605 |
| 9,929,474 | B2 * | 3/2018 | Adada | H01Q 19/191 |
| 9,942,632 | B2 * | 4/2018 | Aveline | H04B 10/90 |
| 10,122,085 | B2 * | 11/2018 | Goyette | H01Q 3/22 |
| 10,170,842 | B2 * | 1/2019 | Adada | H01Q 19/17 |
| 10,243,648 | B2 * | 3/2019 | Wyler | H04B 7/1851 |
| 10,333,218 | B2 * | 6/2019 | Runyon | H01Q 3/30 |
| 10,498,043 | B2 * | 12/2019 | Adada | H01Q 19/17 |
| 10,511,379 | B2 * | 12/2019 | Miller | H04B 7/2041 |
| 10,581,482 | B2 * | 3/2020 | Briand | H03F 3/195 |
| 10,637,151 | B2 * | 4/2020 | Kang | H01Q 15/148 |
| 10,658,757 | B2 * | 5/2020 | Jackson | H01Q 19/191 |
| 2002/0011962 | A1 * | 1/2002 | Luh | H01Q 19/192 343/781 P |
| 2002/0167453 | A1 * | 11/2002 | Kung | H01Q 13/0208 343/786 |
| 2003/0142014 | A1 * | 7/2003 | Rao | H01Q 13/0208 342/354 |
| 2003/0234745 | A1 * | 12/2003 | Choung | H01Q 19/195 343/781 P |
| 2004/0008148 | A1 * | 1/2004 | Lyerly | H01Q 19/19 343/781 P |

(56) References Cited

U.S. PATENT DOCUMENTS

| | | | |
|---|---|---|---|
| 2004/0017332 A1* | 1/2004 | Rao | H01Q 15/148 343/912 |
| 2004/0189538 A1* | 9/2004 | Rao | H01Q 1/288 343/757 |
| 2005/0052333 A1* | 3/2005 | Rao | H01Q 25/007 343/840 |
| 2005/0104794 A1* | 5/2005 | Rao | H01Q 3/2658 343/786 |
| 2008/0153414 A1* | 6/2008 | Ho | H04B 7/18515 455/12.1 |
| 2009/0262037 A1* | 10/2009 | Matyas | H01Q 25/007 343/779 |
| 2010/0321266 A1* | 12/2010 | Schreider | H01Q 5/45 343/777 |
| 2011/0095953 A1* | 4/2011 | Lier | H01Q 15/02 343/755 |
| 2011/0110401 A1* | 5/2011 | Leong | H04B 7/18515 375/211 |
| 2012/0075149 A1* | 3/2012 | Palacin | H01Q 25/007 343/711 |
| 2012/0242539 A1* | 9/2012 | Mizzoni | H01Q 3/2658 342/354 |
| 2015/0102973 A1* | 4/2015 | Hand | H01Q 15/14 343/836 |
| 2015/0188623 A1* | 7/2015 | Angeletti | H04B 7/2041 455/13.3 |
| 2015/0236416 A1* | 8/2015 | Fonseca | H01Q 5/30 343/837 |
| 2016/0011318 A1* | 1/2016 | Cohen | G01S 19/425 342/357.26 |
| 2017/0126307 A1* | 5/2017 | Wyler | H04W 72/0453 |
| 2017/0134835 A1* | 5/2017 | Aveline | H01Q 11/0001 |
| 2017/0288769 A1* | 10/2017 | Miller | H04B 7/18515 |
| 2018/0254866 A1* | 9/2018 | Chen | G05D 1/0022 |
| 2019/0199432 A1* | 6/2019 | Bosshard | H01Q 21/24 |
| 2019/0199433 A1* | 6/2019 | Bosshard | H04B 7/2041 |
| 2019/0238176 A1* | 8/2019 | Briand | H04B 1/709 |
| 2020/0186242 A1* | 6/2020 | Miller | H04B 7/18543 |
| 2020/0274611 A1* | 8/2020 | Mendelsohn | H01Q 1/288 |

OTHER PUBLICATIONS

International Search Report and Written Opinion of the ISA for PCT/EP2018/080577 dated Feb. 5, 2019, 18 pages.

* cited by examiner

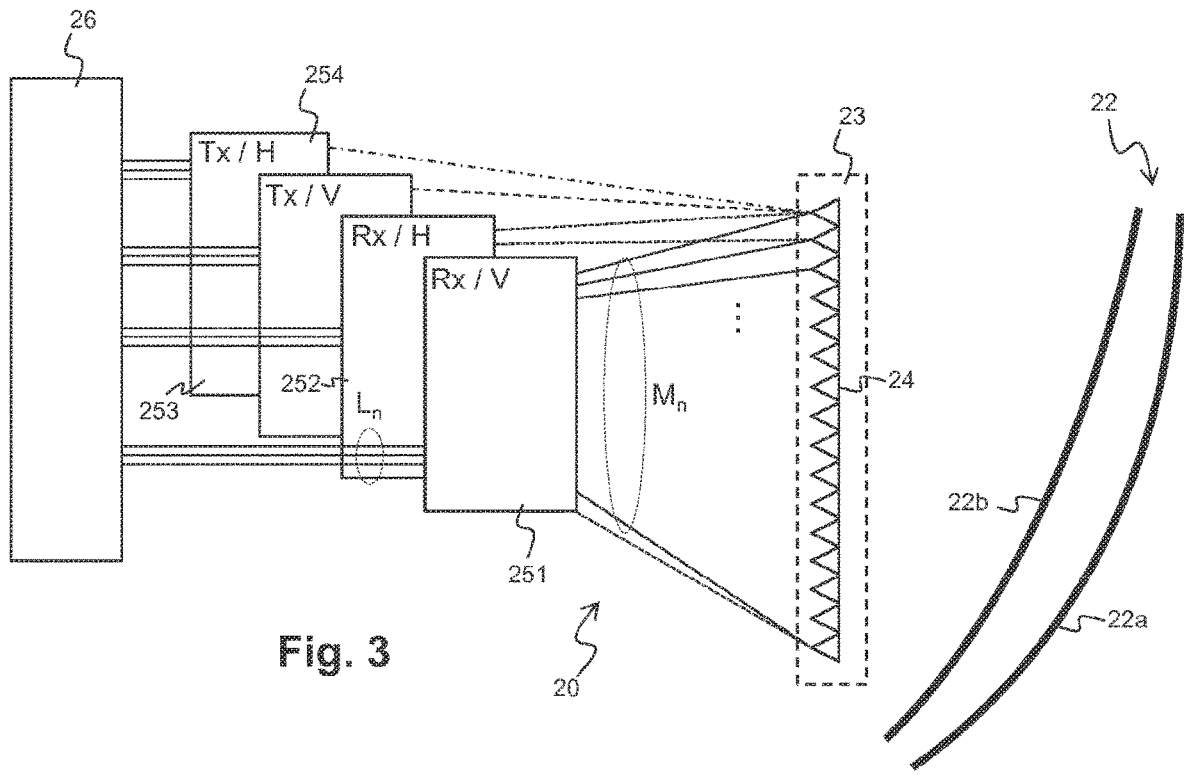
Fig. 3
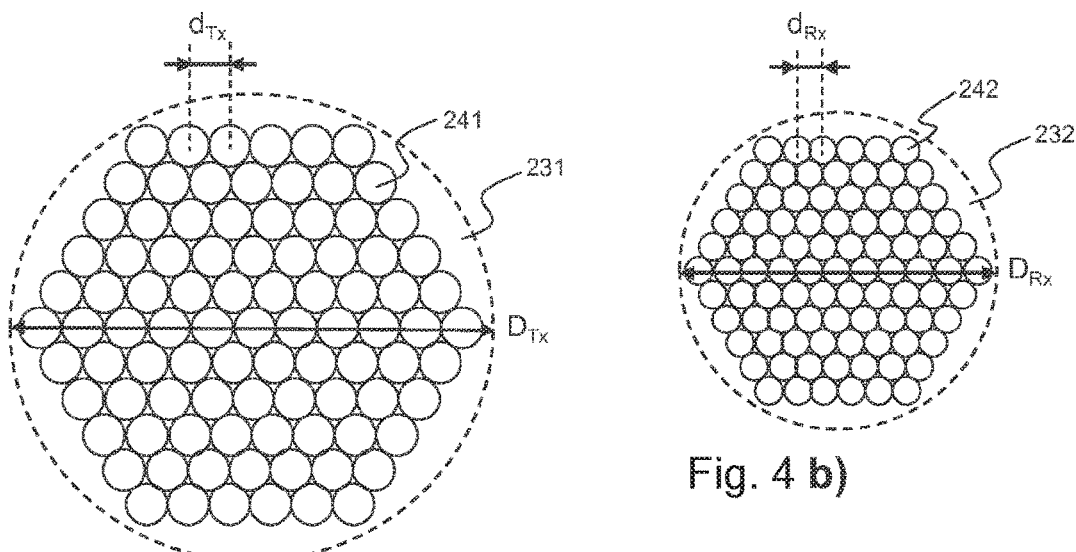
Fig. 4 a)
Fig. 4 b)
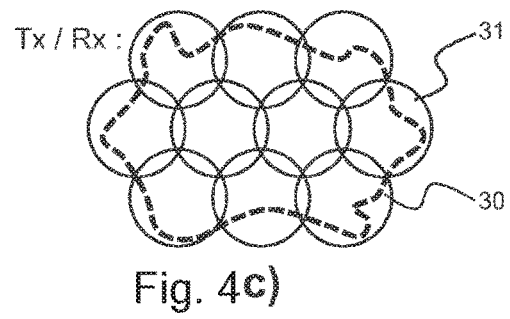
Fig. 4c)

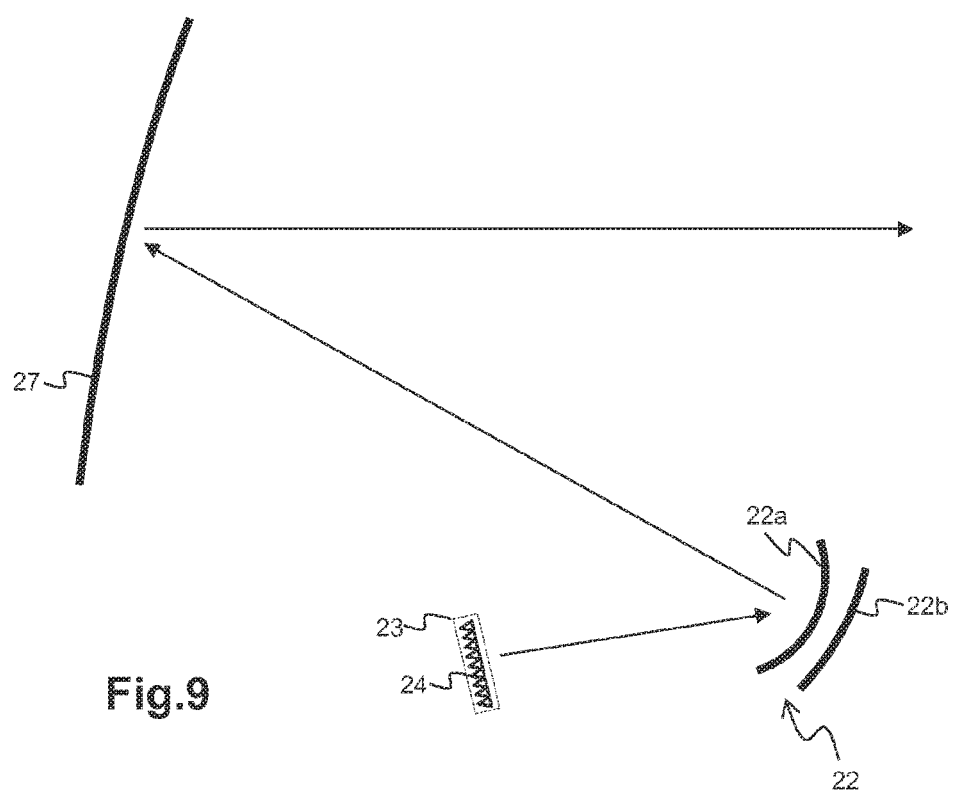

SATELLITE PAYLOAD COMPRISING A DUAL REFLECTIVE SURFACE REFLECTOR

This application is the U.S. national phase of International Application PCT/EP2018/080577 filed Nov. 8, 2018, which designated the U.S. and claims priority to French Patent Application 1760470 filed Nov. 8, 2017, the entire contents of each of which are incorporated by reference.

TECHNICAL FIELD

The present invention relates to the field of satellite telecommunications systems. In particular, the invention relates to a satellite payload comprising a network of sources connected to a beam-forming network and a reflector with a dual reflective surface.

PRIOR ART

Conventionally, a telecommunications satellite comprises a payload equipped with means suitable for exchanging data with one or more terrestrial gateway stations, and with one or more terrestrial user terminals. "Terrestrial" means on the surface of the Earth, in particular at ground level or at the top of a building or tower, etc., immobile or mobile (land, sea or aeronautical vehicle).

Each gateway station implements, for the satellite, a point of access to a terrestrial network core. Thus a gateway station that receives, from the network core, data intended for a user terminal, sends them to the satellite, which retransmits them to said user terminal. In a similar manner, the user terminal can send data to the satellite, which retransmits them to a gateway station, which retransmits them to the network core.

At the present time, there is a great need to increase the capacity of satellite telecommunications systems, in particular to offer high transmission rate services, known as broadband, and/or to serve more user terminals, etc.

Preferably, such an increase in capacity must be accompanied by great flexibility and/or wide geographical coverage.

The existing solutions having a satellite payload with a multibeam antenna comprising a network of sources and a beam-forming network (BFN) appear to offer an optimal compromise between the available maximum bandwidth, the extent of the region covered and the flexibility of allocating more or less bandwidth to certain zones in said region.

However, in order to be able to operate both in transmission and in reception in frequency bands for which the separation between a frequency sub-band used for transmission and a frequency sub-band used to reception is great (as is the case for example for the Ku, Ka, Q or V bands), such a payload must generally comprise a plurality of networks of sources and/or a plurality of reflectors, which considerably increases the complexity, mass and volume of the payload.

Patent applications US 2004/008148 A1 and EP 1083626 A2 give examples of prior art satellite antennas in which two stacked sub-reflectors are used. These documents relate to antennas of the SFPB (Single Feed Per Beam) type in which each source is capable of forming a beam in a particular frequency band. The different sources are spatially isolated at different positions, and the position of each source is defined in relation to a respective sub-reflector.

DISCLOSURE OF THE INVENTION

The objective of the present invention is to remedy all or some of the drawbacks of the prior art, in particular those disclosed above, by proposing a satellite payload that is at the same time flexible in coverage and capacity, compact, lightweight, and of low implementation complexity.

To this end, and according to a first aspect, the present invention proposes a satellite payload of a telecommunications system. Said payload comprises a reflector, a network of sources, and a beam-forming network connected to said sources. The network of sources is used to form beams for transporting signals both in a first frequency band, called "band B1", and in a second frequency band, called "band B2". Each beam is formed by a plurality of sources in the network of sources. The reflector comprises two reflective surfaces positioned one behind the other with respect to the network of sources and having different curvatures so that each reflective surface produces an image of the network of sources with a different magnification factor. The reflective surface closer to the network of sources is transparent for all the signals transported on the band B2 and suitable for reflecting signals transported in the band B1. The other reflective surface is suitable for reflecting signals transported in the band B2.

The sources are suitable for transmitting or receiving signals on the two distinct bands B1 and B2. These bands may in particular have a large frequency space, for example greater than 10% of the centre frequency of the band B1.

The two reflective surfaces are equivalent to two "stacked" reflectors. It may be a case of two surfaces of the same reflector with dual reflective surface (a "front" surface and a "back" surface of the reflector then corresponding respectively to the surface closer to and to the surface further away from the network of sources), or it may be a case of the surfaces of two distinct reflectors, with a single reflective surface, placed one behind the other. The reflective surface closer to the network of sources is suitable for allowing the signals on the band B1 to pass and to reflect the signals on the band B2.

The "magnified image" of the network of sources produced by each reflective surface is an image within the optical meaning of the term.

Such arrangements make it possible in particular to profit from the flexibility offered by a multibeam antenna while limiting the number of sources (a single network of sources is used to transmit or receive the signals on the band B1 and the signals on the band B2), and limiting the volume occupied by the reflector. The curvature of each reflective surface of the reflector may in particular be chosen according to the frequencies of the bands B1 and B2 so that the beams formed on the band B1 are substantially the same as those formed on the band B2, so that they cover substantially the same geographical zones on the surface of the Earth.

In particular embodiments, the invention may further comprise one or more of the following features, taken in isolation or in accordance with all the technically possible combinations.

In particular embodiments, the reflective surface further away from the network of sources is furthermore transparent for all the signals transported on the band B1.

Such arrangements make it possible in particular to improve the performances of the payload of the satellite.

In particular embodiments, signals transported on the band B1 follow a different polarisation from a polarisation followed by signals transported on the band B2, and a transparent reflective surface is electrically inoperative for one of these two polarisations.

In particular embodiments, a transparent reflective surface comprises electrically conductive strips disposed parallel to each other.

Such arrangements make it possible to obtain a selectivity by polarisation for the reflective surface or surfaces. For example, the reflective surface closer to the network of sources comprises metal strips in a so-called "horizontal" direction in order to reflect signals transmitted on the band B1 with a linear polarisation in this horizontal direction, and to let pass signals transmitted on the band B2 with a linear polarisation in a so-called "vertical" direction orthogonal to the horizontal direction.

In particular embodiments, the reflector further comprises means for rotating the reflective surface or surfaces comprising conductive strips.

The rotation movement applied to a reflective surface is for example made on a rotation axis passing through the centre of said reflective surface and substantially perpendicular to a plane tangent to the reflective surface at said centre.

Such arrangements make it possible for example to be able to reverse the polarisation of the signals of the band B1 and the polarisation of the signals of the band B2.

In particular embodiments, a transparent reflective surface is a surface selective for frequency.

Such arrangements make it possible to obtain a selectivity by frequency for the reflective surface or surfaces instead of or in addition to a selectivity by polarisation.

In particular embodiments, the sources may further transmit or receive signals according to different polarisations on the band B1 and/or on the band B2.

This is because, if the reflective surface or surfaces have a selectivity by frequency, it remains possible to use different polarisations for signals transmitted or received on each band B1 or B2. This means that it is possible, for example, to simultaneously use two different polarisations in reception on the band B1, and two different polarisations in transmission on the band B2. Such arrangements make it possible in particular to favour the reuse of frequencies in the band B1 or B2 (for example two beams can simultaneously use the same frequency or the same frequency sub-band without causing interferences since they will have different polarisations).

In particular embodiments, the ratio between the magnification factors is defined according to the frequencies of the bands B1 and B2 so that the beams formed on the band B1 and the beams formed on the band B2 cover identical geographical zones.

This means that a predetermined geographical zone can be covered by a beam formed on the band B1 and a beam formed on the band B2 that are similar, or in other words that a beam formed on a band B1 and a beam formed on a band B2 can cover identical geographical zones.

It should be noted that "identical geographical zones" means geographical zones that are substantially identical, that is to say geographical zones having substantially the same form, the same dimensions and the same geographical positions, it being understood that the beams formed probably do not cover strictly identical geographical zones.

In particular embodiments, the ratio between the magnification factors is substantially equal to a ratio between a particular wavelength of the band B1 and a particular wavelength of the band B2.

"Substantially equal to" means for example that the ratio between the magnification factors is equal to the ratio between a particular wavelength of the band B1 and a particular wavelength of the band B2 with a margin of error of around 10% (in other words the ratio between the magnification factors lies in the range from 90% to 110% of the ratio between a particular wavelength of the band B1 and a particular wavelength of the band B2).

In particular embodiments, the ratio between the magnification factors is between 90% and 110% of a ratio $$\frac{\lambda_{min,B1}}{\lambda_{min,B2}},$$

where $\lambda_{min,B1}$ and $\lambda_{min,B2}$ are respectively the shortest wavelength of the band B1 and the shortest wavelength of the band B2.

In particular embodiments:
the reflective surfaces are concave with respect to the network of sources and have respectively the focal distance $F_{B1}$ and $F_{B2}$,
the network of sources is offset respectively by a distance $\delta_{B1}$ and $\delta_{B2}$ with respect to a focal plane of a reflective surface towards said reflective surface,
the values of $F_{B1}$, $F_{B2}$, $\delta_{B1}$, $\delta_{B2}$ and the distance separating the two reflective surfaces are chosen so that, the magnification factors of the reflective surfaces being respectively denoted $M_{B1}$ and $M_{B2}$, the ratio $$\frac{M_{B1}}{M_{B2}} = \frac{F_{B1}}{\delta_{B1}} \cdot \frac{\delta_{B2}}{F_{B2}}$$

is substantially equal to $$\frac{\lambda_{min,B1}}{\lambda_{min,B2}},$$

where $\lambda_{min,B1}$ and $\lambda_{min,B2}$ are respectively the shortest wavelength of the band B1 and the shortest wavelength of the band B2.

"Substantially equal to" means for example that the ratio between the magnification factors is equal to the ratio between the smallest wavelengths of the band B1 and the smallest wavelengths of the band B2 with a margin of error of around 10% (in other words the ratio between the magnification factors lies in a range from 90% to 110% of the ratio between the shortest wavelength of the band B1 and the shortest wavelength of the band B2.

In particular embodiments, the band B1 and/or the band B2 belong to one of the bands Ku, Ka, Q or V.

In particular embodiments, the band B1 and the band B2 correspond respectively to all the uplink frequencies and to all the downlink frequencies of one of the bands Ku, Ka, Q or V.

In particular embodiments, the band B1 corresponds to all the uplink frequencies of the band Ka, and the band B2 corresponds to all the downlink frequencies of the band Ka.

In particular embodiments, the reflector and/or the network of sources is orientable.

In particular embodiments, the reflector comprising two reflective surfaces in any of the preceding embodiments corresponds to a primary reflector or to a secondary reflector of a system with two reflectors (for example a system of the Cassegrain type or a system of the Gregorian type).

According to a second aspect, the present invention relates to a satellite of a satellite telecommunications system, comprising a payload according to any of the preceding embodiments.

PRESENTATION OF THE FIGURES

Figure 2:
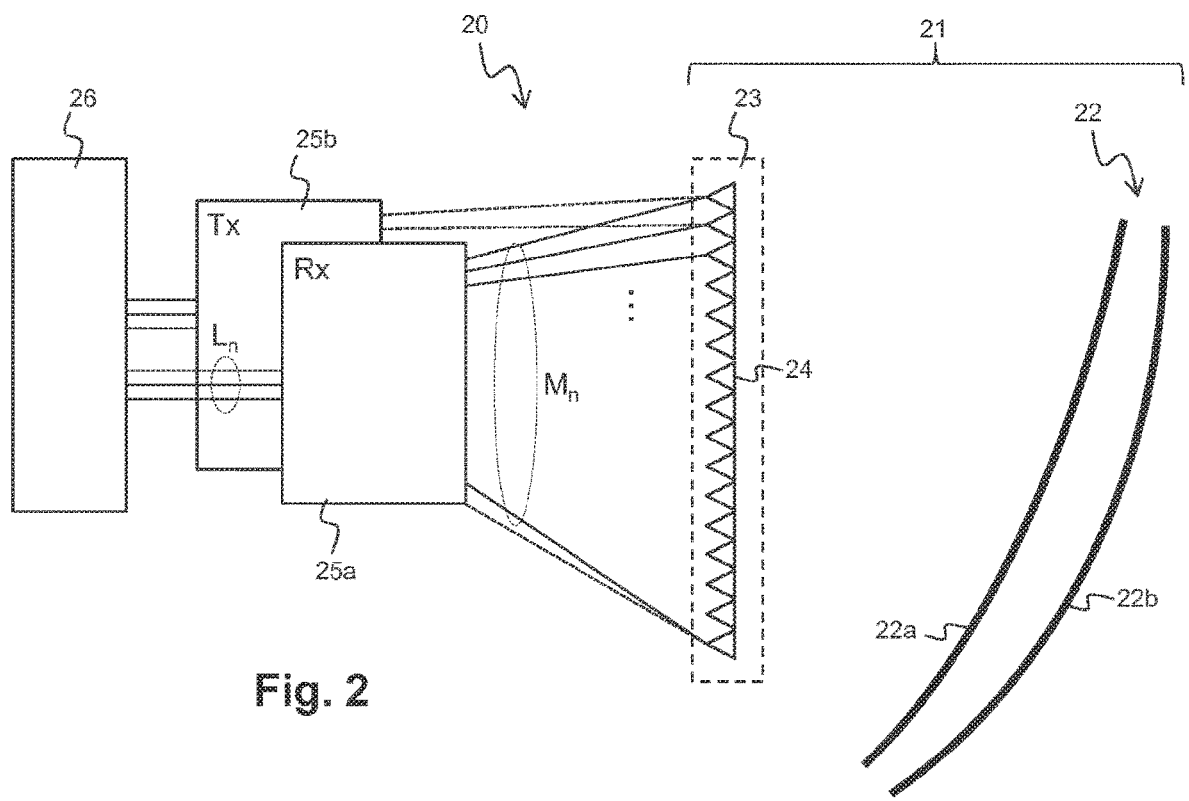

The invention will be understood better from a reading of the following description, given by way of a no way limitative example, and made with reference to FIGS. 1 to 8, which show:

FIG. 1: a schematic representation of a satellite telecommunications system,

FIG. 2: a schematic representation of an example embodiment of a satellite payload according to the invention, FIG. 3: a schematic representation of a preferred embodiment of a satellite payload according to the invention, FIGS. 4(a), 4(b) and 4(c): are examples of use of two distinct networks of sources to form similar beams in transmission and in reception.

Figure 5:
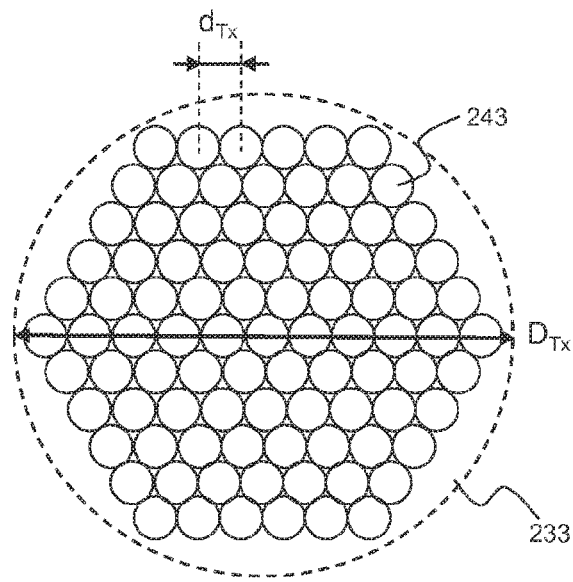
Figure 5:
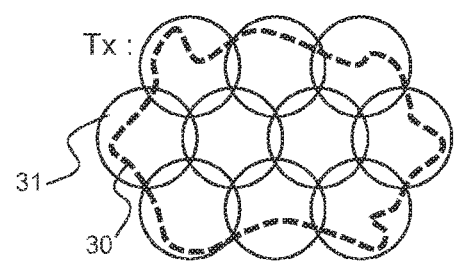
Figure 5:
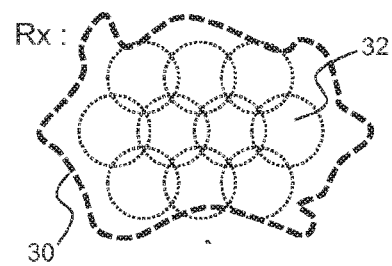
Figure 6:
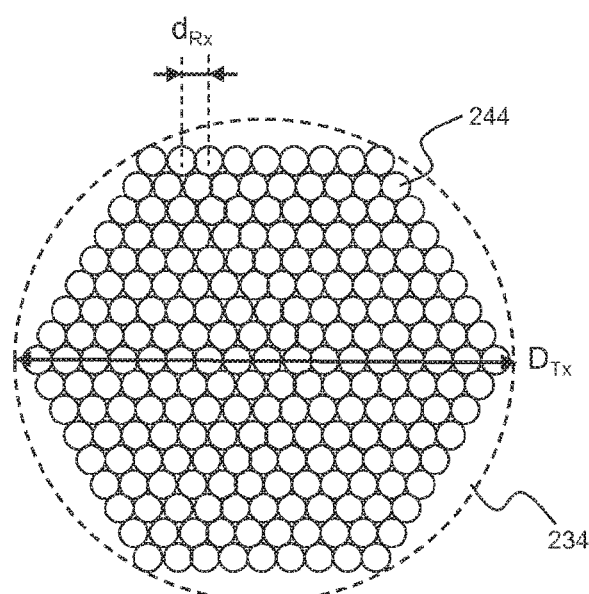
Figure 7:
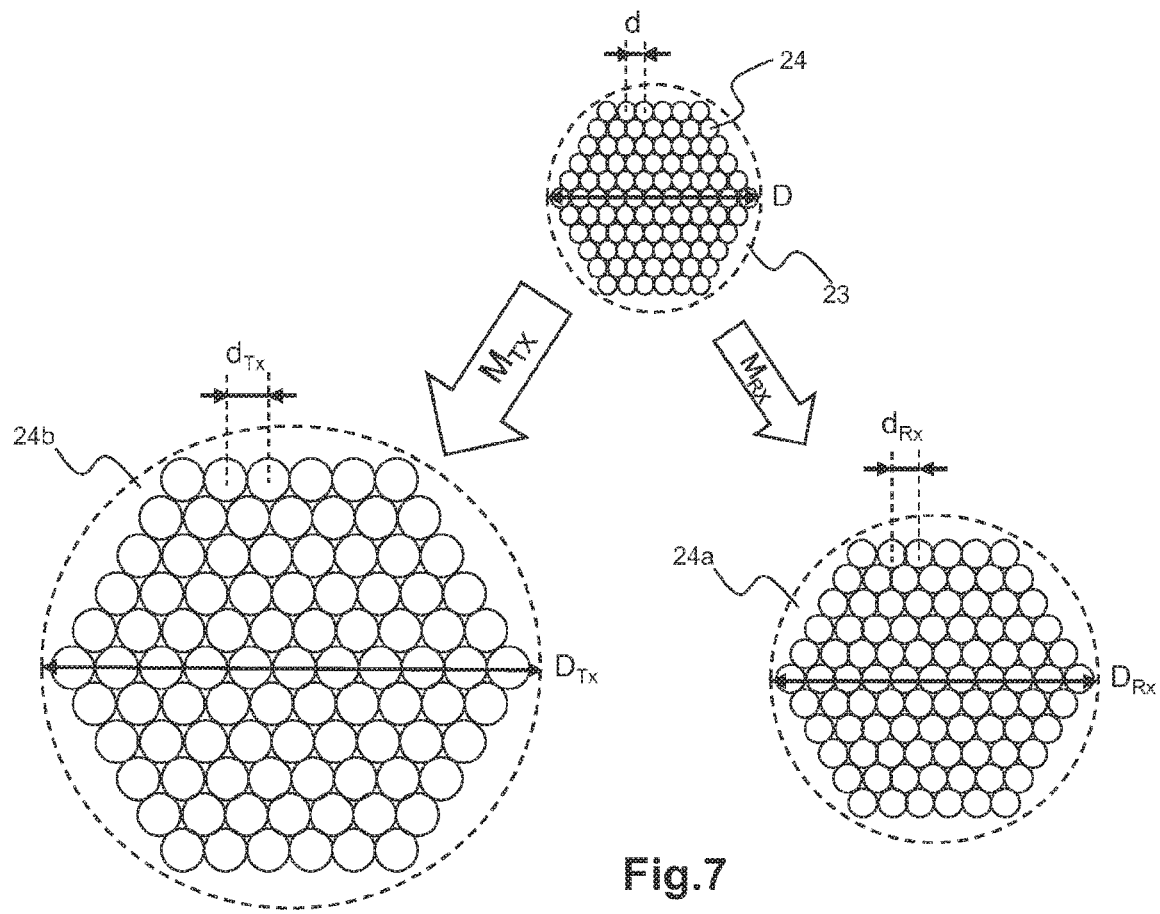
Figure 8:
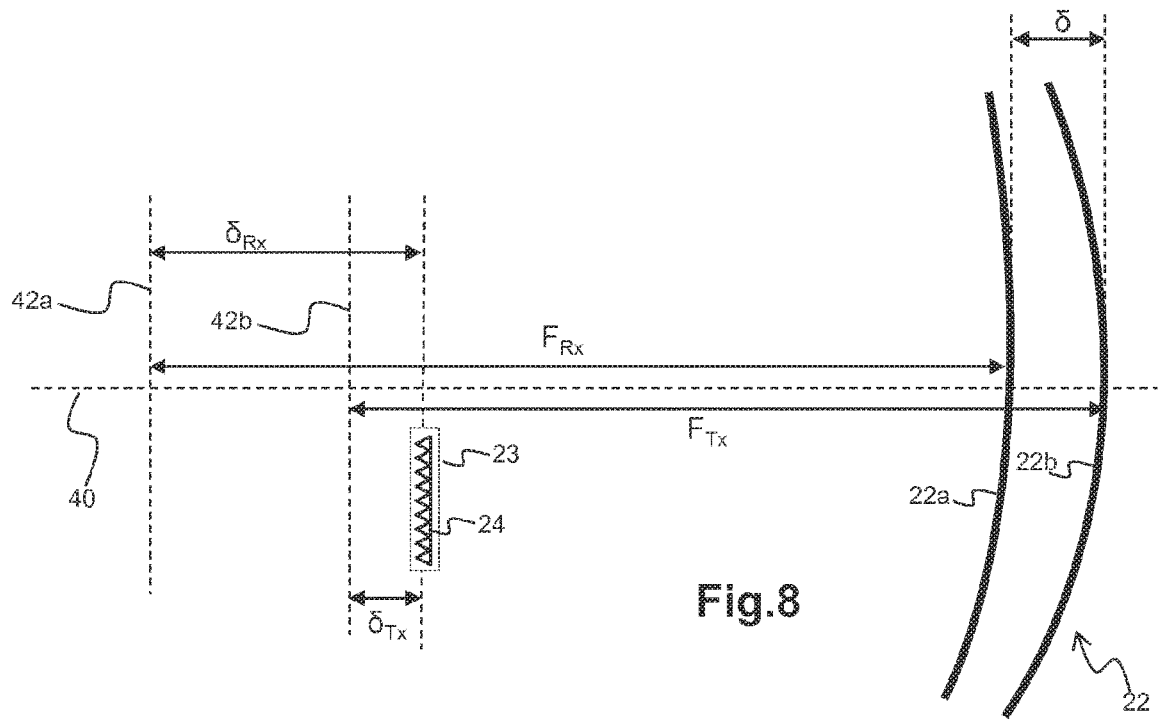

FIGS. 5(a), 5(b) and 5(c): are examples of beams formed in transmission and in reception by a single network of sources, FIG. 6: a schematic illustration of a network of sources oversized so as to form similar beams in transmission and in reception, FIG. 7: a schematic illustration of the solution proposed by the invention consisting of producing two different images of the same network of sources with two different magnification factors, FIG. 8: a schematic representation of a preferred embodiment for a reflector of a satellite payload according to the invention, FIG. 9: a schematic representation of a particular embodiment using two reflectors cooperating with one another.

In these figures, references identical from one figure to another designate identical or similar elements. For reasons of clarity, the elements depicted are not necessarily to scale, unless otherwise mentioned.

DETAILED DESCRIPTION OF EMBODIMENTS

FIG. 1 depicts schematically an example embodiment of a satellite telecommunications system 10.

As illustrated by FIG. 1, the satellite telecommunications system 10 comprises at least one satellite 12, at least one terrestrial gateway station 13 and at least one terrestrial user terminal 14.

The remainder of the description relates non-limitatively to the case where the satellite 12 is in geostationary orbit (GEO). Nothing however excludes, according to other examples, considering a non-geostationary terrestrial orbit, such as a low Earth orbit (LEO), a medium Earth orbit (MEO), etc.

Conventionally, the satellite 12 comprises a payload suitable for exchanging data with the gateway station 13 over a feeder link 15, and exchanging data with each user terminal 14 over a user link 16. A user link 16 may comprise a downlink direction for the sending of data by the satellite and/or an uplink direction for the reception of data by the satellite. In a similar manner, a feeder link 15 may comprise an uplink direction for the reception of data by the satellite and/or a downlink direction for the transmission of data by the satellite. In no way limitatively, the example illustrated in FIG. 1 represents a reception of data coming from the gateway station 13 by the satellite 12 (uplink direction) over a feeder link 15, and transmissions of data from the satellite 12 to user terminals 14 (downlink direction) over user links 16.

The transmissions and/or receptions over the user links 16 and/or over the feeder links 15 take place for example in one or more frequency bands among the bands W, Q, V, Ka, Ku, L, S, C, etc.

The remainder of the description relates by way of example and in no way limitatively to the case where the feeder links 15 and the user links 16 are bidirectional links (that is to say each link has an uplink and downlink direction), and the payload of the satellite 12 comprises an antenna 21 that is used for the transmission and reception of data over the feeder links 15 and over the user links 16.

The invention is particularly well suited to the case where the antenna 21 uses the same frequency band in transmission and in reception, for example the band Ka, for which the frequency sub-band used in reception and the frequency sub-band used in transmission have a high frequency separation, for example greater than 1 GHz. The band Ka may for example be used both for the user links 16 and for the feeder links 15.

It should however be noted that the invention is also applicable to other frequency bands, such as for example the bands Ku, V or Q.

Thus, in a variant, the antenna 21 can be used for example for the transmission and reception of data over the feeder links 15 on a given band (for example the band Ka), whereas another antenna is used for the transmission and reception of data over the user links 16 on another band (for example the band Ku).

Also nothing excludes, according to another example, the antenna 21 being used for example for transmitting data over the feeder links 15 and for receiving data over the user links 16, and another antenna being used for receiving data over the feeder links 15 and for transmitting data over the user links 16.

Also nothing excludes, according to yet another example, the antenna 21 being solely used in reception, but on two distinct bands (for example for receiving data over the feeder links 15 on the band Ka and for receiving data over the user links 16 on the band Ku), or conversely the antenna 21 being used only in transmission on two distinct bands.

In general terms, the invention is applicable to the case where an antenna 21 of the payload 20 of the satellite 12 is used for transmitting or receiving data on a first frequency band, and for transmitting or receiving data on a second frequency band, in the case where the first and second frequency bands have a large frequency separation, for example greater than 10% of the centre frequency of the band B1.

The remainder of the description relates, by way of example and in no way limitatively, to the case where the satellite 12 uses the band Ka for transmitting and receiving data both on the feeder link 15 and on the user links 16. In other words, the reception frequency band for the antenna 21 of the satellite 12, called "band Rx" in the remainder of the description, corresponds to all the uplink frequencies between 27 and 29.5 GHz, and the transmission frequency band for the antenna 21 of the satellite 12, called "band Tx" in the remainder of the description, corresponds to all the downlink frequencies between 17.3 GHz and 20.2 GHz.

FIG. 2 depicts schematically an example of embodiment of a payload 20 intended to be embedded in the satellite 12.

As illustrated by FIG. 2, the payload 20 comprises an antenna 21 comprising a reflector 22 and a network 23 of sources 24.

In the example illustrated in FIG. 2, the payload 20 also comprises two beam-forming networks (BFNs) 25a, 25b that are connected to the various sources 24 of the network

23. These beam-forming networks 25*a*, 25*b* are for example adaptive, and may be analogue or digital. "Adaptive" means that the beams formed by each of these beam-forming networks 25*a*, 25*b* may vary over time. "Analogue" means that such a beam-forming network 25*a*, 25*b* performs processing operations on analogue signals (electrical or microwave). "Digital" means that such a beam-forming network 25*a*, 25*b* performs processing operations on digital signals.

The beam-forming networks 25*a*, 25*b* may be of any type known to persons skilled in the art. The remainder of the description relates by way of an in no way limitative example to the case of beam-forming networks 25*a*, 25*b* of the phase shifter type.

Thus each beam-forming network 25*a*, 25*b* may, in a manner known to persons skilled in the art, comprise phase-shifter circuits suitable for introducing a phase shift of controllable value, controllable gain amplifiers, and duplicator circuits that duplicate a signal to be transmitted and/or adder circuits that add received signals.

One of the two beam-forming networks 25*b* is configured for transmitting data. It comprises one or more input ports on which it receives one or more signals comprising data to be transmitted, and a plurality of output ports connected to the sources 24 of the network 23. This beam-forming network 25*b* supplies, on some output ports, replies to each signal having respective phases and gains making it possible to form predetermined beams, in collaboration with the sources 24 and the reflector 22 of the antenna. Each input signal is thus transmitted by a plurality of sources 24 ("multiple feeds per beam" or MFPB).

The other beam-forming network 25*a* is configured for receiving signals. It comprises a plurality of input ports connected to the sources 24 of the network 23 and one or more output ports on which it supplies one or more signals comprising received data. Particular phases and gains are applied to signals received on certain input ports, and then a signal corresponding to the sum of the signals obtained is supplied on an output port. Each output signal is thus obtained from signals received by means of a plurality of sources 24.

It should be noted that the two beam-forming networks 25*a*, 25*b* depicted in FIG. 2 correspond to two different functional elements that could optionally be used by one and the same physical entity, in particular in the case of digital beam-forming networks.

As illustrated by FIG. 2, the payload 20 also comprises a module 26 for controlling said beam-forming networks 25*a*, 25*b*, configured to modify the beams that are to be activated at a given instant for each beam-forming network 25*a*, 25*b*. The control module 26 comprises for example one or more processors and storage means (magnetic hard disk, electronic memory, optical disk, etc.) wherein a computer program product is stored, in the form of a set of program code instructions to be executed. Alternatively or in addition, the control module 26 comprises one or more programmable logic circuits (FPGA, PLD etc.) and/or one or more specialised integrated circuits (ASIC, etc.), and/or a set of discrete electronic components, etc.

In the example illustrated by FIG. 2, and non-limitatively, the control module 26 also supplies the signals at the input of the beam-forming network 25*b* in transmission, and receives the signals output from the beam-forming network 25*a* in reception. However, nothing excludes, according to other examples, the input signals (respectively the output signals) of the beam-forming network 25*b* in transmission (respectively of the beam-forming network 25*a* in reception) being supplied (respectively received) by an item of equipment distinct from the control module 26.

In the non-limitative example illustrated in FIG. 2, and for the remainder of the description, each beam-forming network 25*a*, 25*b* is connected to the control module 26 by Ln links (the beam-forming network 25*b* in transmission therefore comprises Ln input ports, and the beam-forming network 25*a* in reception comprises Ln output ports), and to the network 23 of sources 24 by Mn links. The number Mn corresponds to the number of sources 24 of the network 23. The number Ln corresponds to the maximum number of beams that a beam-forming network 25*a*, 25*b* can activate simultaneously in order to serve respective geographical zones within a predetermined geographical region on the surface of the Earth. The geographical zones that can be served by beams within the predetermined geographical region may be either predefined according to a predefined distribution within said geographical region, or defined in an opportunistic and dynamic version in order, for example, to centre one or more beams on towns or geographical zones with a very high demand.

There also, it should be noted that the control module 26 illustrated in FIG. 2 represents a functional element that may optionally be used by the same material element as the one using the beam-forming networks 25*a*, 25*b*.

The reflector 22 comprises two reflective surfaces 22*a*, 22*b* disposed one behind the other, and at least one of the two reflective surfaces 22*a*, 22*b*, namely the reflective surface 22*a* situated closer to the network 23 of sources 24, is transparent for all the signals received on the band Rx or for all the signals transmitted on the band Tx.

For example, the reflective surface 22*a* is suitable for reflecting signals received on the band Rx and for allowing signals transmitted on the band Tx to pass. According to another example, the reflective surface 22*a* is suitable for reflecting signals transmitted on the band Tx and for allowing signals received on the band Rx to pass. However, according to yet another example, nothing excludes the reflective surface 22*a* being transparent for all the signals received on the band Rx and the other reflective surface 22*b* being transparent for all the signals transmitted on the band Tx.

In the example illustrated in FIG. 2, and for the remainder of the description, it is considered by way of in no way limitative example that the reflective surface 22*a* situated closer to the network 23 of sources 24 is suitable for reflecting signals received on the band Rx and for being transparent to signals transmitted on the band Tx. The reflective surface 22*b* situated behind the reflective surface 22*a* with respect to the network 23 of sources 24 is suitable for reflecting signals transmitted on the band Tx and may optionally be transparent to signals received on the band Rx. It is in fact advantageous for each reflective surface 22*a*, 22*b* to be transparent respectively to the band Tx and to the band Rx since the performances of the antenna 21 are then better.

In particular embodiments, the signals received by the sources 24 on the band Rx follow a polarisation different from a polarisation followed by signals transmitted by the sources 24 on the band Tx, and at least the reflective surface 22*a* is electrically transparent to one of these two polarisations.

For example, the signals received on the band Rx follow a linear polarisation in a so-called "vertical" direction and the signals transmitted on the band Tx follow a linear polarisation in a so-called "horizontal" direction that is orthogonal to the "vertical" direction. The reflective surface 22*a* comprises for example a set of electrically conductive strips, for example made from metal, disposed parallel to each other and parallel to the vertical direction of the polarisation of the signals received on the band Rx, and thus said reflective surface 22a is transparent to the signals transmitted on the band Tx with a horizontal linear polarisation, while it reflects the signals received on the band Rx with a vertical linear polarisation. Optionally, in order to improve the performances of the antenna 21, the reflective surface 22b may also comprise a set of metal strips disposed parallel to each other and parallel to the horizontal direction of the polarisation of the signals transmitted on the band Tx, and thus said reflective surface 22b will be transparent to the signals received on the band Rx with a vertical linear polarisation, while it reflects the signals transmitted on the band Rx with a horizontal linear polarisation.

In particular embodiments, the reflector 22 further comprises mechanical means for rotating the reflective surface or surfaces 22a, 22b comprising metal strips as described above. Such arrangements thus make it possible to exchange the polarisation between the signals received on the band Rx and the signals transmitted on the band Tx. For example, considering the reflective surface 22a that comprises vertical metal strips for reflecting signals received on the band Rx in accordance with a vertical linear polarisation and letting pass signals transmitted on the band Tx in accordance with a horizontal linear polarisation, if said reflective surface 22a undergoes a rotation of a quarter turn, it becomes suitable for reflecting signals received on the band Rx in accordance with a horizontal linear polarisation and for letting pass signals transmitted on the band Tx in accordance with a vertical linear polarisation.

It should be noted that other means may be used for exchanging the polarisation between the signals received on the band Rx and the signals transmitted on the band Tx. For example, the reflective surface 22a or the two reflective surfaces 22a, 22b may comprise a set of metal strips in the vertical direction and a set of metal strips in the horizontal direction, and further comprise electronic control components, such as for example diodes, for activating or deactivating, on command, all the horizontal strips or all the vertical strips. For example, the strips are divided into segments, the length of which is less than the wavelength and connected to each other by active components fulfilling the role of switches. When the switches are closed, the strips interact with the wave and form a polarising structure. When the switches are open, the lengths of the segments are on the other hand sufficiently small for them not to interact with the wave. In order to switch between polarisations it is then necessary for example to close all the switches of the horizontal strips and to open all the switches of the vertical strips, or vice versa.

In particular embodiments of the invention, at least one of the two reflective surfaces 22a, 22b, namely the reflective surface 22a situated closer to the network 23 of sources 24, is a surface selective for frequency, such as for example a dichroic reflector. A dichroic reflector has properties of transmission and reflection of an electromagnetic wave that are greatly dependent on the wavelength. For example, the reflective surface 22a reflects signals received on a frequency band belonging to the band Rx and lets pass signals transmitted on a frequency band belonging to the band Tx. Optionally, the reflective surface 22b reflects signals transmitted on a frequency band belonging to the band Tx and lets pass signals transmitted on a frequency band belonging to the band Rx. Advantageously, the two reflective surfaces 22a, 22b are selective for frequency.

In preferred embodiments, the reflective surface 22a and the reflective surface 22b are both selective for frequency, and the sources 24 of the network 23 are further suitable for generating signals in accordance with different polarisations on the band Rx and/or on the band Tx. It is thus a case of being able to simultaneously use two different polarisations in Rx and two different polarisations in Tx. For example, "two different polarisations" means a vertical linear polarisation and a horizontal linear polarisation, or a left-hand circular polarisation (LHCP) and a right-hand circular polarisation (RHCP).

FIG. 3 depicts schematically such an embodiment. As illustrated in FIG. 3, the payload 20 of the satellite 12 comprises four beam-forming networks. A first beam-forming network 251 is configured to receive signals on the band Rx in accordance with a linear polarisation in a so-called vertical direction, a second beam-forming network 252 is configured to receive signals on the band Rx in accordance with a linear polarisation in a so-called horizontal direction orthogonal to the vertical direction, a third beam-forming network 253 is configured to transmit signals on the band Tx in accordance with a linear polarisation in the vertical direction, and a fourth beam-forming network 254 is configured to transmit signals on the band Tx in accordance with a linear polarisation in the horizontal direction. Such arrangements make it possible to simultaneously reuse the same frequency or the same frequency sub-band in the band Rx or in the band Tx in accordance with two different polarisations in the same beam or in two beams serving close geographical zones. A different polarisation for two signals using the same frequency or the same frequency sub-band makes it possible in fact to distinguish said signals, whereas interferences would be too high to be able to distinguish said signals without this difference in polarisation.

There also, it is necessary to note that the four beam-forming networks 251 to 254 illustrated in FIG. 3 could optionally be used by a single physical entity, in particular if it is a case of digital beam-forming networks. They are depicted separately in FIG. 3 since they correspond to distinct functional elements.

Moreover, it should be noted that the example described in FIG. 3 uses vertical and horizontal linear polarisations, but it is also possible to use other types of polarisation. In particular, in a variant, it is possible to use left-hand (LHCP) and right-hand (RHCP) circular polarisations.

The two reflective surfaces 22a, 22b are for example paraboloids of revolution and have different curvatures. Each reflective surface 22a, 22b thus produces a magnified (in the optical sense of the term) image of the network 23 of sources 24 with a different magnification factor. As will be explained in more detail subsequently, in order to have geographical zones covered by similar beams in reception and in transmission, the ratio between said magnification factors is advantageously defined according to the frequencies of the band Rx and the frequencies of the band Tx.

The network 23 of sources 24 is for example offset with respect to a focal plane of each reflective surface 22a, 22b of the reflector 22, and is arranged between said focal plane and the reflector 22 (antenna of the DAFR, "defocused array fed reflector", type or of the IPA, "imaging phase array", type. In an antenna of the DAFR type, only one subset of the sources 24 of the network 23 participates simultaneously in the formation of a beam. In an antenna of the IPA type, the network 23 of sources 24 is generally more offset with respect to the focal plane than with an antenna of the DAFR type, and all the sources 24 of the network 23 participate simultaneously in the formation of a beam. The description relates by way of an in no way limitative example to the case of an antenna 21 of the DAFR type.

In the examples illustrated in FIG. 2 and in FIG. 3, each source 24 of the network 23 participates both in the transmission and the reception of signals. Each source 24 is thus for example associated with a low-noise amplifier (LNA) for the reception of signals, and with a solid state power amplifier (SSPA) for the transmission of signals. The complexity, cost, mass and volume of the payload 20 are thus greatly related to the number of sources 24 in the network 23, as well as to the number of elements (LNAs, power amplifiers) connected to these sources. It is necessary to reduce this number as far as possible while preserving the performances and flexibility required for the mission of the satellite 12.

Using one and the same network 23 of sources 24 for the transmission and reception of signals is a means for limiting the number of sources 24 to be installed in the payload 20 of the satellite 12, in comparison with solutions that install for example two different networks of sources, one for reception and the other for transmission.

As is known to persons skilled in the art, there do however exist constraints on the dimensions and spacing of the sources 24 according to the frequencies at which they operate, which in principle form an obstacle to the possibility of using the same network 23 of sources 24 for transmission and reception, in particular if it is wished to cover identical or almost identical geographical zones in transmission and in reception, and if the band Rx and the band Tx are separated from one another by a high separation, for example greater than 1 GHz, which is in particular the case with the band Ka.

A first constraint is based on the relationship existing between the directivity of an antenna, the aperture of the antenna and the wavelength of the working frequency of the antenna.

Directivity means the ratio between the power radiated by an antenna in a given direction and the power that an isotropic antenna would radiate. Aperture means here the surface occupied approximately by all the sources 24 of the network 23.

It is thus known to persons skilled in the art that the directivity of an antenna is substantially proportional to its aperture and to the inverse of the square of the wavelength used. In other words, if the aperture is assimilated to the surface of a disc, in order to form directive beams an antenna must have an aperture diameter that is larger, the longer the wavelength used. Thus a required directivity value and a maximum wavelength in the given frequency band impose a minimum size for the diameter of the aperture.

A second constraint is based on the relationship existing between the distance separating two sources 24 of the network 23 and the appearance of so-called "network" lobes in the radiation of the antenna. Network lobes become closer (in terms of difference in angular direction with respect to the angular direction of a principal lobe corresponding to the beam that it is wished to form) and stronger (in terms of directivity) when the distance separating two sources 24 of the network 23 increases. These network lobes may be a source of interferences for signals exchanged in different beams. This relationship is also dependent on the wavelength used. The shorter the wavelength used, the shorter must be the distance separating two sources 24 of the network 23 in order to limit the presence of network lobes. Thus threshold values for the network lobes (in terms of angular direction and/or directivity) and a minimum wavelength in a given frequency band impose a maximum distance separating two sources 24 of the network 23.

FIGS. 4 to 6 illustrate schematically in the prior art the difficulty in using a single network 23 of sources 24 for the transmission and reception of signals when the band Rx and the band Tx are separated from one another by a great distance, for example greater than 1 GHz (which is in particular the case for the band Ka), and when it is wished to cover identical or almost identical geographical zones, in transmission and in reception. To simplify the explanation, FIGS. 4 to 6 relate to the case of an antenna without a reflector of the DRA (direct radiating array) type. It should nevertheless be noted that each network of sources illustrated in FIGS. 4 to 6 could also be seen as the image produced by a conventional reflector of a network of sources of an antenna with a reflector.

Part a) of FIG. 4 depicts schematically a network 231 of sources 241 suitable for transmitting signals on the band Tx of the band Ka according to predetermined beams. In the example in question, the sources 241 are arranged so that they are inscribed in a circle the surface area of which is assimilated to the aperture of the network 231. The sources 241 are adjacent to each other, but a maximum distance separating the centres of two adjacent sources 241 (and therefore the maximum surface area of a source 241 and the maximum number of sources 241 in the network) is imposed by the constraints related to the network lobes.

It should be noted that, in the example in question, in no way limitatively, the sources 241 are in the form of a disc. In variants, the sources 241 could have other forms, such as for example squares, hexagons, etc. Thus the arrangement of the sources 241 could be different from the one illustrated by the part a) in FIG. 4.

As illustrated in part c) of FIG. 4, the beams are predetermined for example so that each beam covers a geographical zone 31 of a geographical region 30 on the surface of the earth, and so that the whole of said geographical region 30 is covered by all the beams. The constraints related to the aperture of the network 231 and to the spacing of the sources 241 described above then make it possible to determine a maximum distance di separating the centre of two adjacent sources 241 and a minimum diameter $D_{Tx}$ of the aperture of the network 231 of sources 241 used in transmission, accordingly respectively to the minimum wavelength and the maximum wavelength of the frequencies of the band Tx. The number of sources 241 can then also be determined. In the example in question, the network 231 of sources 241 for transmission contains 144 (one hundred and forty four) sources 241, it has a diameter $D_{Tx}$ of 75 cm, and the distance $d_{Tx}$ separating the centres of two adjacent sources 241 is 5.41 cm. The minimum and respectively maximum wavelength in the Tx band is 1.49 cm and respectively 1.73 cm.

It should be noted that FIG. 4 is schematic and that the number of sources 241 depicted does not strictly correspond to reality (in other words not all the sources 241 are depicted). The same applies to the other figures depicting a network of sources.

In a similar manner, it is possible, from the same constraints and in order to cover identical or almost identical geographical zones 31, to determine a maximum distance $d_{Rx}$ separating the centre of two sources 242 and a minimum diameter $D_{Rx}$ of the aperture of a network 232 of sources 242 used in reception according respectively to the minimum wavelength and the maximum wavelength of the frequencies of the band Rx. The part b) in FIG. 4 depicts schematically such a network 232 of sources 242 suitable for receiving signals of the band Rx from the band Ka. In the example in question, the network 232 of sources 242 for reception then contains 127 (one hundred and twenty seven) sources 242, it has a diameter $D_{Rx}$ of 48 cm and a distance $d_{Rx}$ separating the centres of two adjacent sources 242 of 3.71 cm. The minimum and respectively maximum wavelengths in the Rx band are 1.02 cm and respectively 1.11 cm.

Thus it appears that the large difference between the minimum or maximum wavelengths of the band Rx and of the band Tx lead to incompatibilities in terms of sizing of a network of sources for serving given geographical zones 31 in transmission and in reception.

Part a) of FIG. 5 depicts schematically a network 233 of sources 243 similar to the one illustrated in part a) of FIG. 4, but used both in transmission and in reception. It has a diameter $D_{Tx}$ and a distance separating the centres of two sources equal to $d_{Tx}$.

Similarly to the part b) of FIG. 4, the part b) of FIG. 5 depicts schematically the geographical region 30 covered by the beams formed in transmission by this network 233 of sources 243, each beam serving a given geographical zone 31 of the geographical region 30.

The part c) of FIG. 5 depicts schematically the geographical zones 32 corresponding to beams that can be received by the network 233 of sources 243, each beam serving a particular geographical zone 32. As the maximum wavelength of the band Rx is less than the maximum wavelength of the band Tx, for a given aperture, the directivity of the beams in reception is greater than that of the beams in transmission (in other words the aperture angle for the beams in reception is smaller than that of the beams in transmission). Thus each geographical zone 32 covered in reception by a beam is smaller than the corresponding geographical zone 31 covered in transmission. Consequently the beams in reception do not make it possible to cover the whole of the geographical region 30.

FIG. 6 depicts schematically a network 234 of sources 244 of diameter $D_{Tx}$ equal to the diameter of the network 231 of sources 241 described with reference to the part a) of FIG. 4, and for which the distance between the centres of two adjacent sources 244 is equal to the corresponding distance $d_{Rx}$ for the network 232 of sources 242 described with reference to the part b) of FIG. 4. Such a network 234 of sources 244 comprises 308 (three hundred and eight) sources, 127 (one hundred and twenty seven) of which can be used in reception, and the whole can be used in transmission. Such a network 234 of sources 244 then makes it possible to serve geographical zones 31 equivalent to those described with reference to the part c) of FIG. 4 both in transmission and in reception. However, such a network 234 of sources 244 is oversized in that it comprises 308 (three hundred and eight) sources, and 435 (four hundred and thirty five) amplifiers: 127 (one hundred and twenty seven) LNA amplifiers and 308 (three hundred and eight) SSPA amplifiers. Such a number of elements significantly burdens the payload 20 of the satellite 12 in terms of cost, complexity, mass and volume.

To solve the problem described above with reference of FIGS. 4 to 6, the payload 20 according to the invention comprises the same network 23 of sources 24 suitable for operating in two different bands, for example in transmission and in reception, as well as the reflector 22 having two reflective surfaces 22a, 22b.

FIG. 7 depicts schematically a preferred embodiment of a network 23 of sources 24 of the payload 20 according to the invention. The network 23 comprises sources 24 suitable for operating in transmission and in reception (each source 24 is thus for example associated with an LNA amplifier and an SSPA amplifier). The dimensions and arrangement of the sources 24 on the one hand, and the curvature and arrangement of the reflective sources 22a, 22b on the other hand, are such that the image 24b of the network 23 of sources 24 produced by the reflective surface 22b of the reflector 22 is substantially equivalent to the network 231 of sources 241 of the part a) of FIG. 4, and such that the image 24a of the network 23 of sources 24 produced by the reflective surface 22a of the reflector 22 is substantially equivalent to the network 232 of sources 242 of the part b) of FIG. 4.

In other words, if the following are denoted:
$M_{Tx}$ the magnification factor of the reflective surface 22b,
$M_{Rx}$ the magnification factor of the reflective surface 22a,
D the diameter of the aperture of the network 23 of sources 24,
d the distance separating the centres of two adjacent sources 24 of the network 23,
then the following formulae are satisfied:
$D \times M_{Tx} \approx D_{Tx}$
$d \times M_{Tx} \approx d_{Tx}$
$D \times M_{Rx} \approx D_{Rx}$
$d \times M_{Rx} \approx d_{Rx}$
where "A≈B" signifies "A is approximately equal to B", with for example a margin of error of 10% (in other words $$|A - B| \leq \frac{A}{10}).$$

As explained previously, for threshold values in terms firstly of directivity of a beam and secondly angular direction and/or directivity of the network lobes, the diameter $D_{Tx}$ (and respectively $D_{Rx}$) is imposed by the maximum wavelength of the band $T_x$ (and respectively of the band Rx), and the distance $d_{Tx}$ (and respectively $d_{Rx}$) between the centres of two adjacent sources 24 is imposed by the minimum wavelength of the band Tx (and respectively of the band Rx).

In order to be able to cover a predetermined geographical zone with a beam in reception and a beam in transmission that are similar (or in other words so that a beam in transmission and a beam in reception can cover substantially identical geographical zones), the ratio between the magnification factors can advantageously be defined as being substantially equal to a ratio between a particular wavelength of the band Rx and a particular wavelength of the band Tx.

In the example in question, the magnification factors $M_{Tx}$ and $M_{Rx}$ are chosen so that the ratio thereof is substantially equal to the ratio between the minimum wavelength $\lambda_{min,Tx}$ of the band Tx and the minimum wavelength $\lambda_{min,Rx}$ of the band Rx. For the band Ka, $\lambda_{min,Tx}$ is equal to approximately 1.49 cm and $\lambda_{min,Rx}$ is equal to approximately 1.02 cm. Then, for example, the value 2.5 is chosen for $M_{Tx}$ and the value 1.7 for $M_{Rx}$. The network 23 then comprises 144 (one hundred and forty four) sources, the diameter D is equal to approximately 28 cm and the distance d is equal to approximately 2.1 cm.

It should be noted that other methods can be used to define the magnification factors $M_{Tx}$ and $M_{Rx}$ according to the frequencies of the band Rx and the frequencies of the band Tx. For example, in a variant, the magnification factors $M_{Tx}$ and $M_{Rx}$ can be chosen so that the ratio thereof is substantially equal to the ratio between the maximum wavelength of the band Tx and the maximum wavelength of the band Rx. According to another example, the magnification factors $M_{Tx}$ and $M_{Rx}$ can be chosen so that the ratio thereof is substantially equal to the ratio between the mean wavelength of the band Tx and the mean wavelength of the band Rx. According to yet another example, the magnification factors $M_{Tx}$ and $M_{Rx}$ can be chosen so that the ratio thereof is substantially equal to the ratio between the sum of the minimum wavelength of the band Tx and the minimum wavelength of the band Rx and the sum of the maximum wavelength of the band Tx and the maximum wavelength of the band Rx.

FIG. 8 depicts schematically the arrangement of the reflective surfaces 22a, 22b of the reflector 22 with respect to the network 23 of sources 24 for a preferred embodiment of the payload 20 according to the invention.

The reflective surface 22a is suitable for reflecting signals received on the band Rx and for letting pass signals transmitted on the band Tx. The curvature of the reflective surface 22a is such that it has a focal distance $F_{Rx}$. The network 23 of sources 24 is offset with respect to a focal plane 42a of the reflective surface 22a by a distance denoted $\delta_{Rx}$.

The reflective surface 22b is suitable for reflecting signals transmitted on the band Tx and for letting pass signals received on the band Rx. The curvature of the reflective surface 22b is such that it has a focal distance $F_{Tx}$. The network 23 of sources 24 is offset with respect to a focal plane 42b of the reflective surface 22b by a distance denoted $\delta_{Tx}$.

The two reflective surfaces 22a, 22b have substantially the same focal axis 40 and the distance between the two reflective surfaces 22a, 22b along this focal axis 40 is denoted $\delta$.

The values $F_{Tx}$, $F_{Rx}$, $\delta_{Tx}$, $\delta_{Tx}$ are then chosen so that they satisfy the following equation (1):

$$\frac{M_{Tx}}{M_{Rx}} = \frac{F_{Tx}}{\delta_{Tx}} \cdot \frac{\delta_{Rx}}{F_{Rx}} \qquad (1)$$

For example, the following values are chosen:
$M_{Tx}$=2.5
$M_{Rx}$=1.7
$F_{Tx}$=5 m
$F_{Rx}$=6.8 m
$\delta_{Tx}$=2 m
$\delta_{Rx}$=4 m
The value of $\delta$ can now be calculated as follows:

$\delta = F_{Tx} - (F_{Rx} - \delta_{Rx} + \delta_{Tx})$

Then $\delta$=0.2 m is obtained.

There may be several methods for choosing these values. For example, the values $F_{Tx}$, $F_{Rx}$ and $\delta_{Rx}$ are fixed arbitrarily, and then the values $\delta_{Tx}$ and $\delta$ are derived in order to satisfy formula (1). According to another example, the values $\delta_{Rx}$, $\delta_{Tx}$ and $F_{Tx}$ are fixed arbitrarily, and then the values $F_{Rx}$ and $\delta$ are derived in order to satisfy formula (1).

In particular embodiments, the reflector 22 and/or the network 23 of sources 24 is orientable in order to be able to cover various geographical regions 30 during the mission of the satellite 12.

In particular embodiments, for example if the satellite 12 must cover different geographical regions in transmission and reception, the reflective surfaces 22a, 22b may be formed and arranged so that the geographical areas covered by the beams in transmission are different (for example in form, size and position) from the geographical zones covered by the beams in reception.

In particular embodiments, one of the two reflective surfaces 22a, 22b may be substantially planar (magnification factor substantially equal to 1), for example if the network 23 of sources 24 directly has suitable dimensions for forming beams suited to the geographical zones 31 to be covered in transmission or reception.

In particular embodiments, the payload 20 of the satellite 12 may incorporate another reflector used in association with the reflector 22 with a dual reflective surface according to the invention. Such systems using a so-called "primary" reflector and a so-called "secondary" reflector (or "sub-reflector") are known to persons skilled in the art, for example the systems of the Cassegrain or Gregorian type, or the so-called "confocal antenna" systems.

FIG. 9 illustrates schematically an embodiment with a confocal system. In a confocal system, the focal point of a primary reflector must coincide substantially with the focal point of the secondary reflector. Moreover, it is known that the magnification factor of a conventional confocal system corresponds to the ratio between the focal distance of the primary reflector and the focal distance of the secondary reflector.

As illustrated in FIG. 9, a primary reflector 27 cooperates with a secondary reflector 22 in order to transmit or receive the signals coming from or intended for the sources 24. The secondary reflector 22 is a reflector having two reflective surfaces 22a, 22b. It should be noted that, in the example illustrated in FIG. 9, and contrary to the example illustrated in FIG. 8, it is the reflective surface 22a closer to the network 23 of sources 24 that is more curved and which operates in transmission on the band Tx. The other reflective surface 22b is less curved and operates on the band Rx.

Since the reflective surface 22a is more curved, it has a shorter focal distance than the other reflective surface 22b. It is then possible, by suitably choosing the distance separating the two reflective surfaces 22a and 22b, to ensure that the focal point of each reflective surface 22a, 22b coincides substantially with the focal point of the primary reflector 27. In addition, if the following are denoted:

F: the focal distance of the primary reflector 27
$F_{Tx}$ et $F_{Rx}$: the respective focal distances of the reflective surfaces 22a and 22b of the secondary reflector 22, then the respective magnification factors $M_{Tx}$ in transmission and $M_{Rx}$ in reception are defined thus:

$$M_{Tx} = \frac{F}{F_{Tx}}$$

$$M_{Rx} = \frac{F}{F_{Rx}}$$

It is then possible to obtain required magnification values for $M_{Tx}$ and $M_{Rx}$ by suitably choosing the focal distances F, $F_{Tx}$ and $F_{Rx}$.

In the example illustrated in FIG. 9, the secondary reflector 22 is a reflector 22 with a dual reflective surface according to the invention, and the primary reflector 27 is a conventional reflector having a single reflective surface. However, in a variant, nothing prevents it being the primary reflector that is a reflector 22 with a dual reflective surface and the secondary reflector being a conventional reflector having a single reflective surface, or even the two primary and secondary reflectors being reflectors 22 with a dual reflective surface.

The above description illustrates clearly that, through its various features and the advantages thereof, the present invention achieves the objectives determined.

In particular, the use of a multibeam antenna of the MFPB type with a network 23 of sources 24 and one or more beam-forming networks 25a, 25b offers the required flexibility in terms of coverage and capacity by virtue of the sharing of the power and of the bandwidth available at the payload 20 of the satellite 12. Moreover, the solution proposed is of low complexity and particularly compact, both with regard to the network 23 of sources 24 and with regard to the reflector 22. This is because using a single network 23 of sources 24 for transmission and reception makes it possible to limit the number of sources 24. Furthermore, the invention makes it possible to use a total number of amplifiers (LNA, SSPA) comparable with the number corresponding to a solution using two distinct networks of sources, one in reception and the other in transmission. This total number of amplifiers is appreciably less than the one corresponding to a "primitive" solution such as the one described with reference to FIG. 6. This leads to a gain in terms of complexity, volume and mass. Furthermore, the use of a reflector with a dual reflective surface makes it possible to considerably limit the volume occupied by the antenna as well as the mass thereof, in comparison for example with systems for which a plurality of distinct reflectors must be used and placed in direct line of sight with a network of sources. All these features thus confer a significant advantage on the payload 20 according to the invention in terms of complexity, volume and mass.

More generally, it should be noted that the embodiments considered above have been described by way of non-limitative examples, and that other variants can consequently be envisaged.

In particular, in describing the invention, it has been considered that the antenna 21 of the payload 20 of the satellite 12 is configured so as to transmit and receive signals respectively on the band Tx and the band Rx of the band Ka. However, in general terms, the invention is applicable to the case where an antenna 21 of the payload 20 of the satellite 12 is used for the transmission or reception of data on a first frequency band, referred to as "band B1", and for transmission or reception of data on a second frequency band, referred to as "band B2", in the case where band B1 and band B2 have a large frequency separation, for example greater than 10% of the centre frequency of band B1.

Thus the form, arrangement or dimensions of the sources 24 or of the network 23 have been given by way of an in no way limitative example. Other choices for these parameters correspond to variants of the invention. For example, the sources 24 could have a square or hexagonal shape, and could be arranged within the network 23 differently than in the form of a disc, for example according to the form of the geographical region to be covered.

In the same way, the curvature and arrangement of the reflective surfaces 22a, 22b in the examples described must not be considered to be limitative. Other values may in fact be chosen for example for the focal distances of the reflective surfaces 22a, 22b, for the distances between the network 23 of sources 24 and the focal planes of the reflective surfaces, or for the distance separating the two reflective surfaces.

Two examples of selectivity have been proposed for the reflective surfaces 22a, 22b: by polarisation, or by frequency. There also, it can be envisaged choosing other solutions for making a reflective surface transparent for signals transported on a frequency band. Such alternative solutions must be considered to be variants of the invention.

The invention claimed is:

1. A payload of a satellite of a satellite telecommunication system, said payload comprising:
    a reflector,
    a network of sources, and
    a beam-forming network connected to said sources,
    wherein said network of sources is configured to process beams which transport signals both in a first frequency band (band B1) and in a second frequency band (band B2), each of the beams processed by a plurality of the sources in said network of sources, and each of the plurality of sources of the network of sources is configured to process the beams for band B1 and for band B2,
    wherein the reflector comprises two reflective surfaces positioned one behind the other and aligned such that a straight line projects through the two reflective surfaces and through the network of sources,
    wherein the two reflective surfaces have different curvatures so that each reflective surface of the two reflective surfaces produces an image of the network of sources with a different magnification factor,
    wherein a first of the reflective surfaces is closer to the network of sources and is transparent for all signals transported on the band B2 and configured to reflect signals transported in the band B1, and
    wherein a second of the reflective surfaces is configured to reflect signals transported in the band B2.

2. The payload according to claim 1, wherein the second reflective surface is further away than the first reflective surface from the network of sources, and is transparent to all signals transported on the band B1.

3. The payload according to claim 1, wherein the signals transported on the band B1 follow a first polarisation different from a second polarisation followed by the signals transported on the band B2, and the first reflective surface is inoperative electrically for the first polarisation and the second reflective surface is inoperative electrically for the second polarisations.

4. The payload according to claim 3, wherein each of the reflective surfaces comprises electrically conductive parallel strips.

5. The payload according to claim 4, wherein the reflector further comprises means for rotating at least one of the reflective surfaces.

6. The payload according to claim 1, wherein each of the reflective surfaces is configured to be a surface selective for a frequency.

7. The payload according to claim 6, wherein the sources are configured to transmit or receive signals in different polarisations on the band B1 and/or on the band B2.

8. The payload according to claim 1, wherein a ratio between the magnification factors is defined according to frequencies of bands B1 and B2 so that beams formed on the band B1 and beams formed on the band B2 cover identical geographical zones.

9. The payload according to claim 8, wherein the ratio between the magnification factors is between 90% and 110% of a ratio between a particular wavelength of the band B1 and a particular wavelength of the band B2.

10. The payload according to claim 9, wherein the ratio between the magnification factors is between 90% and 110% of a ratio, where $\lambda min,B1$ and $\lambda min,B2$ are respectively a shortest wavelength of the band B1 and a shortest wavelength of the band B2.

11. The payload according to claim 1, wherein the band B1 and/or the band B2 belong to one of bands Ku, Ka, Q or V.

12. The payload according to claim 1, wherein the band B1 and the band B2 correspond respectively to all uplink frequencies and to all downlink frequencies of one of bands Ku, Ka, Q or V.

13. The payload according to claim 1, wherein the reflector and/or the network of sources is orientable.

14. The payload according to claim 1, wherein the two reflectors are, respectively, a primary reflector and a secondary reflector of a two-reflector system.

15. A satellite in a satellite telecommunication system, including the payload according to claim 1.

* * * * *